United States Patent
Kodera

(10) Patent No.: US 9,981,685 B2
(45) Date of Patent: May 29, 2018

(54) STEERING CONTROL DEVICE

(71) Applicant: JTEKT CORPORATION, Osaka-shi, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 51 days.

(21) Appl. No.: 15/212,437

(22) Filed: Jul. 18, 2016

(65) Prior Publication Data
US 2017/0021858 A1 Jan. 26, 2017

(30) Foreign Application Priority Data

Jul. 24, 2015 (JP) .................... 2015-146896

(51) Int. Cl.
*B62D 6/08* (2006.01)
*B62D 6/00* (2006.01)
*B62D 5/00* (2006.01)

(52) U.S. Cl.
CPC ............. *B62D 6/008* (2013.01); *B62D 5/008* (2013.01)

(58) Field of Classification Search
CPC ............................... B62D 6/008; B62D 5/008
See application file for complete search history.

(56) References Cited

U.S. PATENT DOCUMENTS

| | | | |
|---|---|---|---|
| 6,763,908 B2 | 7/2004 | Ogawa et al. | |
| 2004/0104066 A1 | 6/2004 | Sakai | |
| 2006/0131096 A1 | 6/2006 | Ono et al. | |
| 2006/0200290 A1 | 9/2006 | Chino et al. | |
| 2012/0245799 A1* | 9/2012 | Ono | B62D 5/008 701/42 |
| 2015/0006033 A1* | 1/2015 | Sekiya | B62D 5/001 701/41 |
| 2016/0221601 A1* | 8/2016 | Barthomeuf | B62D 5/0469 |

FOREIGN PATENT DOCUMENTS

| | | |
|---|---|---|
| JP | 2006-176102 A | 7/2006 |
| JP | 4725132 B2 | 7/2011 |

OTHER PUBLICATIONS

Jan. 17, 2017 Extended Search Report issued in European Patent Application No. 16180220.2.

* cited by examiner

*Primary Examiner* — Mussa A Shaawat
*Assistant Examiner* — Michael V Kerrigan
(74) *Attorney, Agent, or Firm* — Oliff PLC

(57) ABSTRACT

A steering control device can restrain a steering from being operated to cause a steered angle and a steering angle to exceed their upper limit values. A first limiting reaction force setting circuit increases a first reaction force rapidly if the steering angle becomes no smaller than a steering angle threshold. A second limiting reaction force setting circuit increases a second reaction force rapidly if the steered angle becomes no smaller than a steered angle threshold. A target steering angle setting circuit sets a target steering angle based on steering torque applied to the steering minus the first reaction force, the second reaction force, etc. A steering angle control circuit sets reaction torque as a manipulated variable for feedback controlling the steering angle to the target steering angle. An operation signal generation circuit outputs an operation signal to a reaction force motor so as to achieve reaction torque.

7 Claims, 4 Drawing Sheets

STEERING CONTROL DEVICE

INCORPORATION BY REFERENCE

The disclosure of Japanese Patent Application No. 2015-146896 filed on Jul. 24, 2015 including the specification, drawings, and abstract, is incorporated herein by reference in its entirety.

BACKGROUND OF THE INVENTION

1. Field of the Invention

The present invention relates to steering control devices that output an operation signal to a steering device that can change the steering angle ratio, namely the ratio between the steered angle of steered wheels of a vehicle and the steering angle, or the rotation angle of a steering.

2. Description of the Related Art

Conventionally, in steering devices, there is an upper limit value permitted for the steered angle of the steered wheels. For example, in those steering devices having a rack and pinion mechanism, axial displacement of a rack is restricted by a rack stopper (end stopper). There is also an upper limit value for the steering angle of the steering wheel in accordance with the upper limit value of the steered angle. Normally, the steered angle and the steering angle are positive when they are rotation angles in a predetermined direction, and are negative when they are rotation angles in the opposite direction. In the following description, the expression "the steering angle and the steered angle are large" means that a variation from the neutral position is large. In other words, the expression "the steering angle and the steered angle are large" means that the absolute values of the steering angle and the steered angle that can have positive and negative values are large.

A process in which a reaction force is applied to the steering wheel immediately before the absolute value of the steered angle reaches its upper limit value in order to control an increase in steered angle is well known in the art. This process is what is called an end abutting process (steering limiting process). For example, Japanese Patent No. 4,725,132 describes a steering limiting process in a steer-by-wire system that steers the steered wheels by steering actuators in accordance with the operation of the steering wheel while cutting off power transmission between the steering wheel and the steered wheels.

The steering wheel is equipped with an airbag, a horn, etc. As well known in the art, electrical wiring for these components is connected via a spiral cable, a signal cable formed in a spiral shape, to electronic equipment fixed to a vehicle body. Japanese Patent Application Publication No. 2006-176102 (JP 2006-176102 A) describes that the length of a spiral cable is set so that a steering can be operated until a rack shaft contacts a rack stopper when the steering angle ratio, namely the ratio of the steered angle to the steering angle, is minimum (see FIG. 13).

The length of the spiral cable is not necessarily set to the length described in JP 2006-176102 A. The following problems occur in the case where the length of an actual spiral cable is shorter than that described in JP 2006-176102 A. In the following description, the steering angle ratio is defined as the steered angle divided by the steering angle.

When the steering limiting process is performed in response to the steering angle approaching its upper limit value that is determined by the length of the spiral cable, the situation is avoided where the steering is operated so as to increase the steering angle to a value larger than its upper limit value. In this case, however, if the steering angle ratio is high, the steering limiting process may not be performed even when the rack shaft contacts the rack stopper, because the steering angle has not reached its upper limit.

On the other hand, in the case where the steering limiting process is performed based on the steered angle, the steering limiting process can be performed before the rack shaft contacts the rack stopper, even if the steering angle ratio is high. In this case, however, if the steering angle ratio is low, the steering angle may reach its upper limit value that is determined by the length of the spiral cable, even if the steered angle has not reached its upper limit. In this case, the steering limiting process may not be performed even if the steering angle reaches its upper limit value.

Not only in the steering devices including a spiral cable and a rack and pinion mechanism, but also in the steering devices in which the steered angle and the steering angle have separate upper limit values, the operation of the steering which causes the steered angle or the steering angle to approach its upper limit value and to exceed its upper limit value may not be able to be limited.

SUMMARY OF THE INVENTION

It is one object of the present invention to provide a steering control device that can restrain a steering from being operated to cause a steered angle to exceed its upper limit value and can also restrain the steering from being operated to cause a steering angle to exceed its upper limit value.

An aspect of the present invention relates to a steering control device that outputs an operation signal to a steering device in which a steering angle ratio is variable, the steering angle ratio being a ratio of a steered angle of a steered wheel of a vehicle to a steering angle that is a rotation angle of a steering. The steering control device includes: a steering angle obtaining circuit that obtains the steering angle; a steered angle obtaining circuit that obtains the steered angle; a first limiting circuit that performs limiting control to urge a user to stop operating the steering to a side where the steering angle further increases, when the obtained steering angle reaches a steering angle threshold; and a second limiting circuit that performs limiting control to urge the user to stop operating the steering to the side where the steering angle further increases, when the obtained steered angle reaches a steered angle threshold.

In the above configuration, before the steering angle reaches its upper limit value, the steering angle reaches the steering angle threshold and the limiting control can be performed. Moreover, before the steered angle reaches its upper limit value, the steered angle reaches the steered angle threshold and the limiting control can be performed. This can restrain the steering from being operated to cause the steered angle to exceed its upper limit value and can also restrain the steering from being operated to cause the steering angle to exceed its upper limit value

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
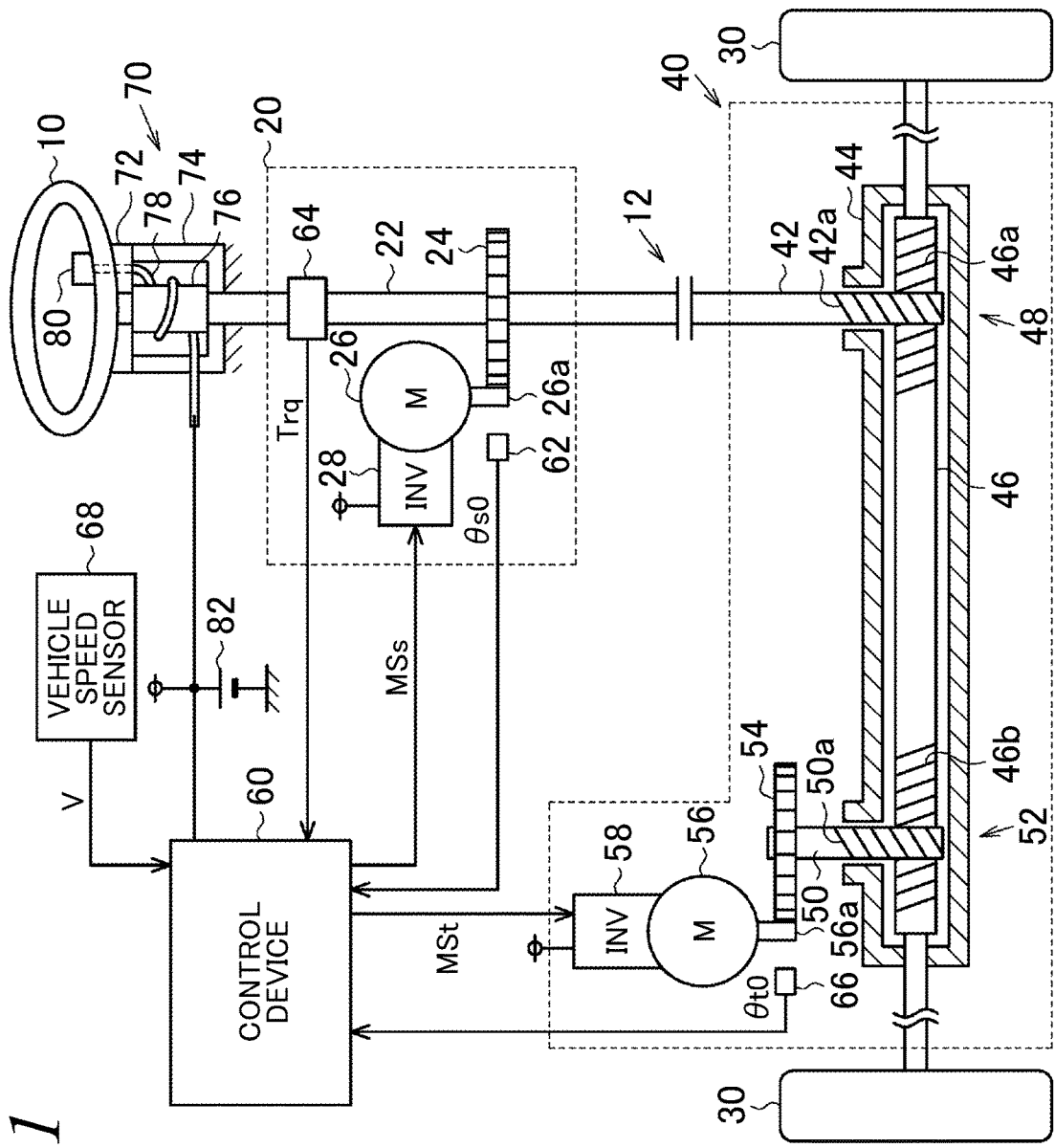
FIG. 1 is a system configuration diagram of a steering device including a steering control device according to a first embodiment.

A first embodiment of a steering control device of the present invention will be described below with reference to the accompanying drawings. As shown in FIG. 1, in a steering device of the present embodiment, a steering wheel 10 that receives input for a steering (steering mechanism) is connected to a reaction force actuator 20 that applies a reaction force, or a force against operation of the steering wheel 10. The reaction force actuator 20 includes a steering shaft 22 fixed to the steering wheel 10, a reaction force-side reduction gear 24, a reaction force motor 26 having a rotary shaft 26a coupled to the reaction force-side reduction gear 24, and an inverter 28 that drives the reaction force motor 26.

The steering shaft 22 can be coupled to a pinion shaft 42 of a steering actuator 40 via a clutch 12. The steering actuator 40 includes a first rack and pinion mechanism 48, a second rack and pinion mechanism 52, a steered-side motor 56, and an inverter 58.

The first rack and pinion mechanism 48 includes a rack shaft 46 and the pinion shaft 42. The rack shaft 46 and the pinion shaft 42 are arranged at a predetermined crossing angle, and first rack teeth 46a formed on the rack shaft 46 mesh with pinion teeth 42a formed on the pinion shaft 42. Steered wheels 30 are coupled to both ends of the rack shaft 46 via tie rods. The steering (steering mechanism) refers to an entire mechanism that converts the input received by the steering wheel 10 into a turning operation of the steered wheels 30.

The second rack and pinion mechanism 52 includes the rack shaft 46 and a pinion shaft 50. The rack shaft 46 and the pinion shaft 50 are arranged at a predetermined crossing angle, and second rack teeth 46b formed on the rack shaft 46 mesh with pinion teeth 50a formed on the pinion shaft 50.

The pinion shaft 50 is connected to a rotary shaft 56a of the steered-side motor 56 via a steered-side reduction gear 54. The inverter 58 is connected to the steered-side motor 56. The rack shaft 46 is accommodated in a rack housing 44.

A steering control device (control device 60) controls steering of the steered wheels 30 in accordance with the operation of the steering wheel 10 by operating the steering device including the reaction force actuator 20 and the steering actuator 40. In the present embodiment, a steer-by-wire system is thus implemented by the reaction force actuator 20 and the steering actuator 40. The control device 60 normally controls steering of the steered wheels 30 in accordance with the operation of the steering wheel 10 while keeping the clutch 12 disengaged. At this time, the control device 60 obtains a rotation angle $\theta s0$ of the rotary shaft 26a of the reaction force motor 26, steering torque Trq applied to the steering shaft 22, a rotation angle $\theta t0$ of the rotary shaft 56a of the steered-side motor 56, and a vehicle speed V. The rotation angle $\theta s0$ of the rotary shaft 26a is detected by a steering-side sensor 62. The steering torque Trq is detected by a torque sensor 64. The rotation angle $\theta t0$ of the rotary shaft 56a is detected by a steered-side sensor 66. The vehicle speed V is detected by a vehicle speed sensor 68.

A spiral cable device 70 is coupled to the steering wheel 10. The spiral cable device 70 includes a first housing 72, a second housing 74, a tubular member 76, and a spiral cable 78. The first housing 72 is fixed to the steering wheel 10, and the second housing 74 is fixed to a vehicle body. The tubular member 76 is accommodated in the space defined by the first and second housings 72, 74 and is fixed to the second housing 74. The spiral cable 78 is wound around the tubular member 76. The tubular member 76 has the steering shaft 22 inserted therein. The spiral cable 78 is electrical wiring that connects a horn 80 fixed to the steering wheel 10 to a battery 82 fixed to the vehicle body, etc.

Figure 2:
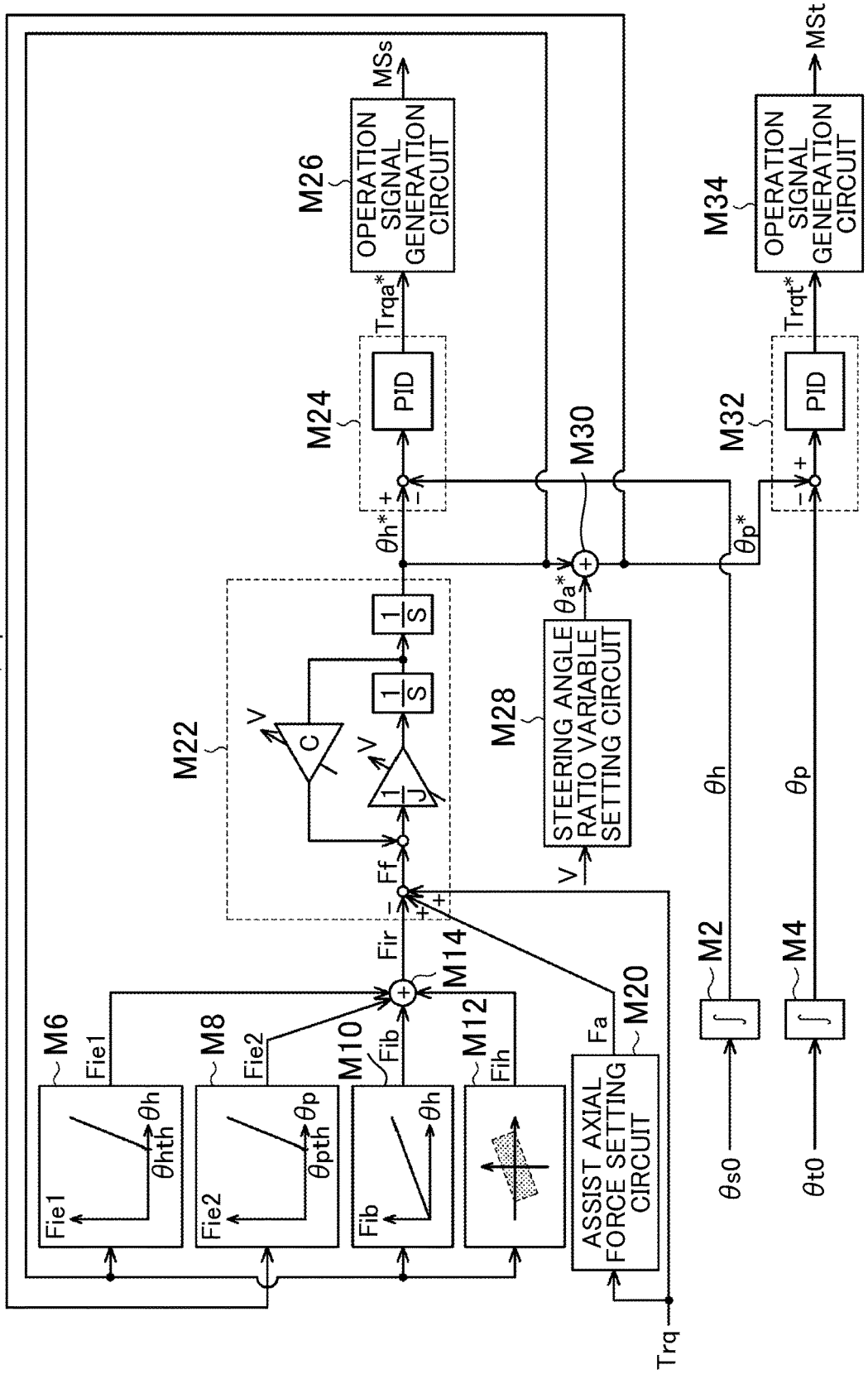
FIG. 2 is a block diagram illustrating a process that is performed by the control device according to the first embodiment.

FIG. 2 shows a part of a process that is performed by the control device 60. An integration circuit M2 converts the rotation angle $\theta s0$ detected by the steering-side sensor 62 to a value in an angle region larger than 0 to 360° and outputs a steering angle $\theta h$. For example, the rotary shaft 26a makes a plurality of rotations in the case where the steering wheel 10 is rotated to the maximum to the right or to the left from a neutral position, or a position where the vehicle is moved straight. Accordingly, for example, the integration circuit M2 outputs 720° in the case where the rotary shaft 26a makes two rotations in a predetermined direction from the state where the steering wheel 10 is in the neutral position. The integration circuit M2 outputs zero when the steering wheel 10 is in the neutral position. Similarly, an integration circuit M4 converts the rotation angle $\theta t0$ detected by the steered-side sensor 62 to a value in an angle region larger than 0 to 360° and outputs a steered angle $\theta p$. The integration circuit M4 outputs zero when the steering wheel 10 is in the neutral position. The steering angle is normally a rotation angle of the steering wheel. However, the steering angle may be a rotation angle of each part of the steering device (except for the steered wheels) which varies in one-to-one correspondence with the rotation angle of the steering wheel, as described above.

The steering angle $\theta h$ and the steered angle $\theta p$ are positive when the detected rotation angle is a rotation angle in the predetermined direction, and are negative when the detected rotation angle is a rotation angle in the opposite direction. For example, the steering angle $\theta h$ and the steered angle $\theta p$ are negative in the case where the rotary shaft 26a is rotated in the opposite direction to the predetermined direction from the state where the steering wheel 10 in the neutral position. However, this is merely an example of the logic of the control system. In particular, as used herein, the expression "the steering angle $\theta h$ and the steered angle $\theta p$ are large" means that a variation from the neutral position is large. In other words, the expression "the steering angle $\theta h$ and the steered angle $\theta p$ are large" means that the absolute values of the parameters that can have positive and negative values are large.

A first limiting reaction force setting circuit M6 sets a first reaction force Fie1, or a reaction force that acts against further operation of the steering wheel 10 toward its upper limit value, when the amount of rotation of the steering wheel 10 approaches its upper limit value.

A second limiting reaction force setting circuit M8 sets a second reaction force Fie2, or a reaction force that acts against further operation of the steering wheel 10 toward its upper limit value, when the steered angle $\theta p$ approaches its upper limit value. A base reaction force setting circuit M10 sets a base reaction force Fib in accordance with operation of the steering wheel 10. A hysteresis reaction force setting circuit M12 sets a hysteresis reaction force Fih so that different reaction forces to be applied to the steering wheel 10 are set depending on the sign of the rate of change of the steering wheel 10. For example, in the case where the steering wheel 10 is being turned to the right with respect to the neutral position, the reaction force to be applied to the steering wheel 10 varies between the case where the steering wheel 10 is turned further to the right and the case where the steering wheel 10 is turned back toward the neutral position.

An addition circuit M14 calculates a total reaction force Fir by adding the first reaction force Fie1, the second reaction force Fie2, the base reaction force Fib, and the hysteresis reaction force Fih. An assist axial force setting circuit M20 calculates an assist axial force Fa based on the steering torque Trq detected by the torque sensor 64. The assist axial force Fa is set to a larger value as the steering torque Trq is larger.

A target steering angle setting circuit M22 sets a target steering angle θh* based on the steering torque Trq detected by the torque sensor 64, the assist axial force Fa, and the total reaction force Fir. The target steering angle setting circuit M22 herein uses a model formula given by the following formula (c1) that correlates a final axial force Ff, which is the sum of the steering torque Trq and the assist axial force Fa minus the total reaction force Fir, with the target steering angle θh*.

$$Ff = C \cdot \theta h^{*\prime} + J \cdot \theta h^{*\prime\prime} \tag{c1}$$

The model given by the formula (c1) is a model that defines the relationship between the torque and the rotation angle of the rotary shaft that rotates with rotation of the steering wheel 10 in the configuration in which the steering wheel 10 is mechanically coupled to the steered wheels 30. In the formula (c1), a coefficient of viscosity C models friction of the steering device etc., and a coefficient of inertia J models inertia of the steering device. The coefficient of viscosity C and the coefficient of inertia J are set variably according to the vehicle speed V. $\theta h^{*\prime}$ represents the first-order differentiation of $\theta h^*$ with respect to time, and $\theta h^{*\prime\prime}$ represents the second-order differentiation of $\theta h^*$ with respect to time.

A steering angle control circuit M24 sets, as a manipulated variable for feedback controlling the steering angle θh to the target steering angle θh*, reaction torque Trqa* to be generated by the reaction force motor 26. Specifically, the steering angle control circuit M24 sets the reaction torque Trqa* to the sum of output values of proportional, integral, and derivative elements each receiving the target steering angle θh* minus the steering angle θh.

An operation signal generation circuit M26 generates an operation signal MSs for the inverter 28 based on the reaction torque Trqa* and outputs the operation signal MSs to the inverter 28. For example, this can be implemented by well-known current feedback control in which a command value for a q-axis current is set based on the reaction torque Trqa* and d- and q-axis voltage command values are set as manipulated variables for feedback controlling d- and q-axis currents to their command values. The d-axis current may be controlled to zero. However, in the case where the rotational speed of the reaction force motor 26 is high, the absolute value of the d-axis current may be set to a value larger than zero to perform field weakening control. The absolute value of the d-axis current may be set to a value larger than zero even in a low rotational speed region.

A steering angle ratio variable setting circuit M28 sets a target operating angle θa* for variably setting the steering angle ratio, or the ratio of the steered angle θp to the steering angle θh, based on the vehicle speed V. An addition circuit M30 calculates a target steered angle θp* by adding the target operating angle θa* to the target steering angle θh*.

A steered angle control circuit M32 sets, as a manipulated variable for feedback controlling the steered angle θp to the target steered angle θp*, a steered-side motor torque target value Trqt* to be generated by the steered-side motor 56. Specifically, the steered angle control circuit M32 sets the steered-side motor torque target value Trqt* to the sum of output values of proportional, integral, and derivative elements each receiving the target steered angle θp* minus the steered angle θp.

An operation signal generation circuit M34 generates an operation signal MSt for the inverter 58 based on the steered-side motor torque target value Trqt* and outputs the operation signal MSt to the inverter 58. The operation signal generation circuit M34 can generate the operation signal MSt in a manner similar to that of the operation signal generation circuit M26.

The base reaction force setting circuit M10 and the hysteresis reaction force setting circuit M12 receive the target steering angle θh*. For example, the base reaction force setting circuit M10 sets the base reaction force Fib to a larger value as the magnitude of the target steering angle θh* (the amount of rotation with respect to the neutral position) is larger. FIG. 2 shows that the base reaction force Fib increases as the target steering angle θh* increases from zero in a predetermined rotational direction. However, the base reaction force Fib increases even if the target steering angle θh* increases in the opposite direction to the predetermined rotational direction. As used herein, the expression "the base reaction force Fib increases" means that a force against the force that is applied by the user to rotate the steering wheel 10 increases. Accordingly, in the case where the base reaction force Fib used herein is treated as a vector quantity, the expression "the base reaction force Fib increases" means that the absolute value of the base reaction force Fib increases.

The first limiting reaction force setting circuit M6 receives the target steering angle θh* and sets the first reaction force Fie1. The first reaction force Fie1 is set in order to perform the control to increase the force that is applied to the steering wheel 10 immediately before the steering wheel 10 is rotated to its upper limit value determined by the spiral cable 78. A steering angle threshold θhth is set to a value slightly smaller than the upper limit value of the steering angle θh. The first reaction force Fie1 is set to a value larger than zero in the case where the steering angle θh is equal to or larger than the steering angle threshold θhth. In particular, if the steering angle θh has a relatively large value larger than the steering angle threshold θhth, the first reaction force Fie1 is set to such a large value that the steering wheel 10 cannot be operated any further by the user's force. In the present embodiment, the first reaction force Fie1 is set based on a map that defines the relationship between the target steering angle θh* and the first reaction force Fie1. FIG. 2 shows that the first reaction force Fie1 increases as the target steering angle θh* increases from zero in the predetermined rotational direction. However, like the base reaction force Fib, the first reaction force Fie1 increases even if the target steering angle θh* increases in the opposite direction to the predetermined rotational direction.

The second limiting reaction force setting circuit M8 receives the target steered angle θp* and sets the second reaction force Fie2. The second reaction force Fie2 is set in order to perform the control to increase the force that is applied to the steering wheel 10 immediately before an end of the rack shaft 46 contacts the rack housing 44 as a result of axial displacement of the rack shaft 46. A steered angle threshold θpth is set to a value slightly smaller than the upper limit value of the steered angle θp. The second reaction force Fie2 is set to a value larger than zero in the case where the steered angle θp is equal to or larger than the steered angle threshold θpth. In particular, if the steered angle θp has a relatively large value larger than the steered angle threshold θpth, the second reaction force Fie2 is set to such a large value that the steering wheel 10 cannot be operated any further by the user's force. In the present embodiment, the second reaction force Fie2 is set based on a map that defines the relationship between the target steering angle θp* and the second reaction force Fie2. FIG. 2 shows that the second reaction force Fie2 increases as the target steered angle θp* increases from zero in the predetermined rotational direction. However, like the base reaction force Fib, the second reaction force Fie2 increases even if the target steered angle θp* increases in the opposite direction to the predetermined rotational direction.

Functions of the present embodiment will be described.

The target steering angle setting circuit M22 sets the target steering angle θh* in accordance with the steering torque Trq that is applied by the user to the steering wheel 10. The addition circuit M30 calculates the target steered angle θp* in accordance with the target steering angle θh*. The steered angle control circuit M32 sets the steered-side motor torque target value Trqt* for controlling the steered angle θp to the target steered angle θp*. The torque of the steered-side motor 56 is thus controlled to the steered-side motor torque target value Trqt*, so that the steered angle θp is controlled to the target steered angle θp*.

The steering angle control circuit M24 sets the reaction torque Trqa* for controlling the steering angle θh to the target steering angle θh*. The target steering angle θh* is set based on the final axial force Ff by which the sum of the steering torque Trq and the assist axial force Fa is brought equal to the total reaction force Fir.

The base reaction force Fib is set to a larger value as the steering angle θh is larger. Such a target steering angle θh is set that makes the sum of the steering torque Trq that is applied by the user to the steering wheel 10 and the assist axial force Fa equal to the total reaction force Fir. Accordingly, the larger the steering angle θh is, the larger the reaction force, namely the torque that is applied by the reaction force motor 26 to turn the steering wheel 10 back toward the neutral position, is.

If the target steering angle θh* is about to increase beyond the steering angle threshold θhth, the first reaction force Fie1 increases rapidly as compared to the base reaction force Fib etc. In this case, the total reaction force Fir increases rapidly, and the sum of the steering torque Trq and the assist axial force Fa also increases rapidly. As a result, larger torque (reaction torque Trqa*) is generated by the reaction force motor 26 in order to turn the steering wheel 10 back toward the neutral position, which makes it difficult for the user to turn the steering wheel 10 any further. The steering angle θh is thus sufficiently restrained from changing rapidly and reaching its upper limit value.

If the target steered angle θp* is about to increase beyond the steered angle threshold θpth, the second reaction force Fie2 increases rapidly as compared to the base reaction force Fib etc. In this case, the total reaction force Fir increases rapidly, and the sum of the steering torque Trq and the assist axial force Fa also increases rapidly. As a result, larger torque (reaction torque Trqa*) is generated by the reaction force motor 26 in order to turn the steering wheel 10 back toward the neutral position, which makes it difficult for the user to turn the steering wheel 10 any further. When an increase in target steering angle θh* is limited, an increase in target steered angle θp* is also limited. The steered angle θp is thus sufficiently restrained from changing rapidly and reaching its upper limit value.

The present embodiment described above has the following effects.

(1) The first reaction force Fie1 is set based on the target steering angle θh*, and the second reaction force Fie2 is set based on the target steered angle θp*. This can restrain the steering wheel 10 from being operated to cause the steered angle θp to exceed its upper limit value and can also restrain the steering wheel 10 from being operated to cause the steering angle θh to exceed its upper limit value.

(2) The target steering angle setting circuit M22 is formed by a model. This can reduce the workload for calibration of a controller that controls the reaction force to be applied to the steering wheel 10. For example, if the target steering angle setting circuit M22 is formed by a map that defines the relationship between the steering angle θh and the vehicle speed V and the first reaction force Fie1, rather than by a model, the amount of calibration data for the first limiting reaction force setting circuit M6 is larger than that in the configuration of FIG. 2 because the map has a larger number of dimensions.

(3) The present embodiment includes the spiral cable device 70. If the control to increase the reaction torque is not performed when the steering angle θh becomes equal to or larger than the steering angle threshold θhth, the torque that increases the steering angle θh is applied to the steering wheel 10 even after the steering angle θh reaches its upper limit value determined by the length of the spiral cable 78. In this case, a force that stretches the spiral cable 78 continues to be applied to the spiral cable 78 even after the spiral cable 78 is stretched to the maximum. This may affect the reliability of the spiral cable 78. In the present embodiment, however, the control to increase the reaction force is performed when the steering angle θh becomes equal to or larger than the steering angle threshold θhth. This can restrain a force that stretches the spiral cable 78 from being continuously applied to the spiral cable 78 even after the spiral cable 78 is stretched to the maximum. Reduction in reliability of the spiral cable 78 can therefore be restrained.

A second embodiment of the steering control device will be described below with reference to the drawings. The second embodiment is mainly described with respect to the differences from the first embodiment.

Figure 3:
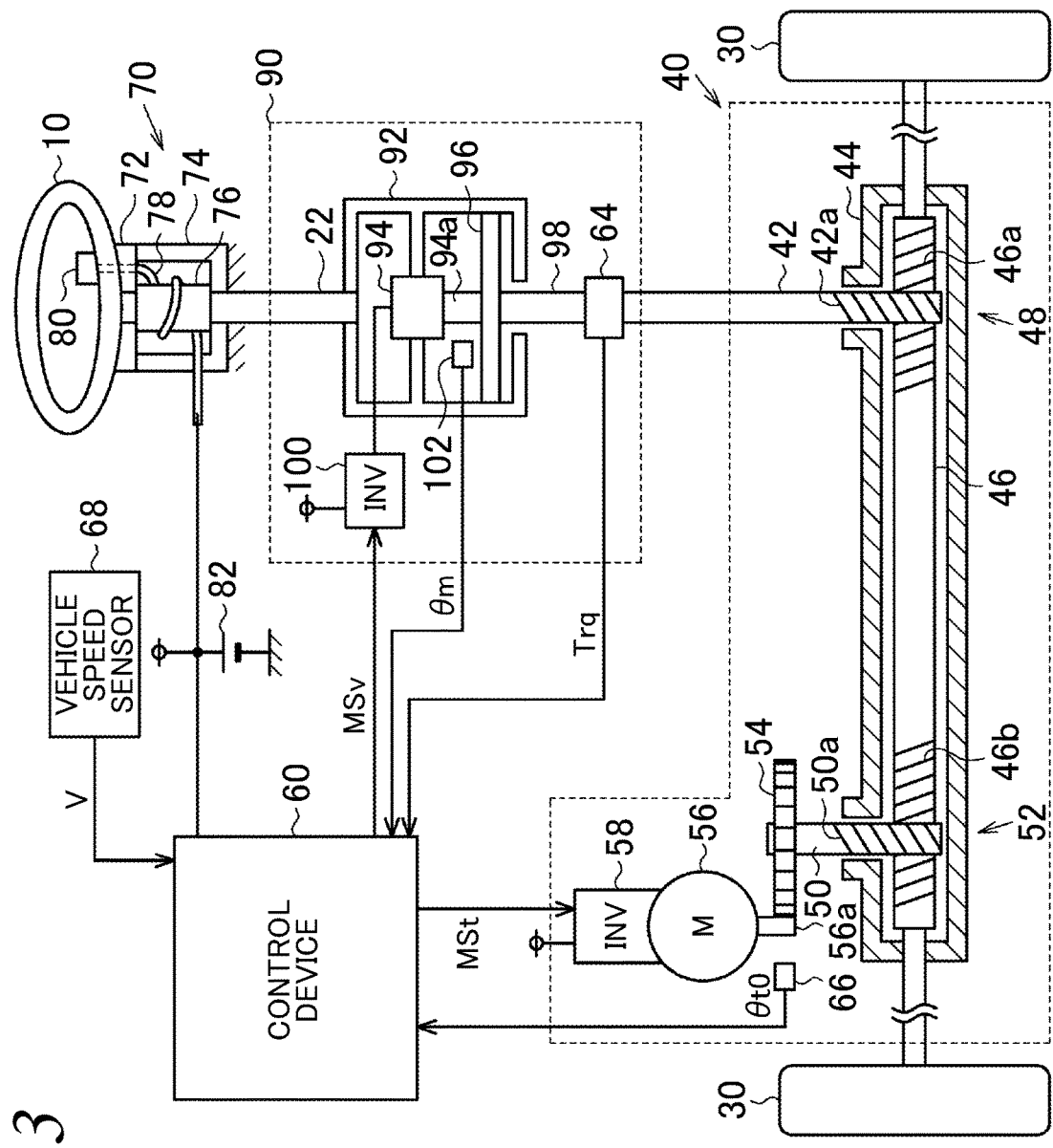
FIG. 3 is a system configuration diagram of a steering device including a steering control device according to a second embodiment.

FIG. 3 shows a system configuration according to the present embodiment. In FIG. 3, the members corresponding to those in FIG. 1 are denoted by the same reference characters for convenience. A steering device according to the present embodiment includes a variable steering angle ratio (VGR) system including a variable steering angle ratio (VGR) actuator 90 instead of the reaction force actuator 20. The VGR actuator 90 includes a housing 92, a VGR motor 94, an inverter 100, and a reduction gear mechanism 96. The housing 92 is coupled to the steering shaft 22 so that it can rotate with the steering shaft 22. The VGR motor 94 is accommodated in the housing 92. The reduction gear mechanism 96 is formed by a mechanism comprised of three rotary elements that can rotate differentially with respect to each other. For example, the reduction gear mechanism 96 is faulted by a planetary gear mechanism, strain wave gearing, etc. Three rotary elements of the reduction gear mechanism 96 are coupled to the housing 92, a rotary shaft 94a coupled to a rotary shaft of the VGR motor 94, and an output shaft 98 coupled to the pinion shaft 42, respectively.

In the reduction gear mechanism 96, the rotational speed of the output shaft 98 is thus uniquely determined by the rotational speed of the housing 92 and the rotational speed of the VGR motor 94. The VGR actuator 90 adds rotation of the rotary shaft 94a of the VGR motor 94 to rotation of the steering shaft 22 associated with the steering operation and transmits the resultant rotation to the output shaft 98 through the reduction gear mechanism 96. The VGR actuator 90 thus changes the rotation angle of the output shaft 98 relative to the steering shaft 22. The steering angle ratio, or the ratio of the steered angle θp to the steering angle θh, is thus set variably. As used herein, term "adding" includes both addition and subtraction. In the following description, the rotation angle of the output shaft 98 relative to the steering shaft 22 is referred to as the operating angle θa of the output shaft 98.

Figure 4:
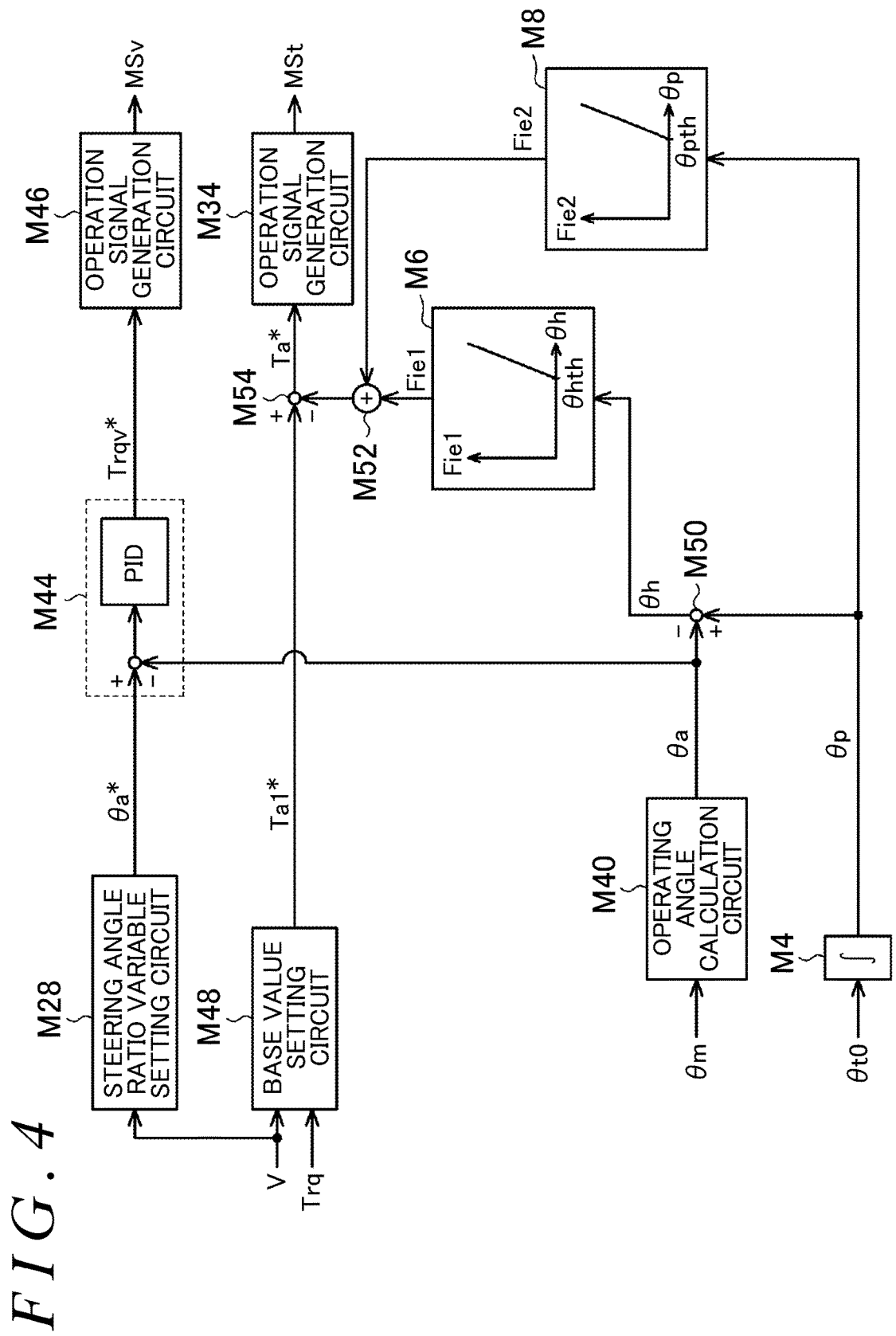
FIG. 4 is a block diagram illustrating a process that is performed by the control device according to the second embodiment.

A steering angle ratio-side sensor 102 detects the rotation angle θm of the rotary shaft 94a of the VGR motor 94. The torque sensor 64 detects steering torque Trq of the output shaft 98. FIG. 4 shows a process that is performed by the control device 60 according to the present embodiment. In FIG. 4, the steps corresponding to those in FIG. 2 are denoted by the same reference characters for convenience.

An operating angle calculation circuit M40 calculates an actual operating angle θa of the output shaft 98 from the rotation angle θm, based on the reduction ratio determined in accordance with the gear ratio between the rotary elements of the reduction gear mechanism 96. A steering angle ratio control circuit M44 calculates steering angle ratio torque Trqv* as a manipulated variable for feedback controlling the operating angle θa to a target operating angle θa*. Specifically, the operating angle calculation circuit M40 sets the steering angle ratio torque Trqv* to the sum of output values of proportional, integral, and derivative elements each receiving the target operating angle θa* minus the operating angle θa.

An operation signal generation circuit M46 generates an operation signal MSv for the inverter 100 and outputs the operation signal MSv to the inverter 100. The inverter 100 controls the torque of the VGR motor 94 to the steering angle ratio torque Trqv*. The operation signal generation circuit M46 can generate the operation signal MSv in a manner similar to that of the operation signal generation circuit M26.

A base value setting circuit M48 sets a base value Ta1* of assist torque based on the steering torque Trq detected by the torque sensor 64 and the vehicle speed V detected by the vehicle speed sensor 68. The base value Ta1* is set to a larger value as the steering torque Trq is larger.

A subtraction circuit M50 calculates the steering angle θh by subtracting the operating angle θa from the steered angle θp. An addition circuit M52 adds the first reaction force Fie1 set by the first limiting reaction force setting circuit M6 and the second reaction force Fie2 set by the second limiting reaction force setting circuit M8, and outputs the sum of the first reaction force Fie1 and the second reaction force Fei2 to a correction circuit M54. The correction circuit M54 subtracts the output value of the addition circuit M52 from the base value Ta1* and outputs the subtraction result as assist torque Ta*.

An operation signal generation circuit M34 generates an operation signal MSt for controlling the torque of the steered-side motor 56 to the assist torque Ta*, and outputs the operation signal MSt to the inverter 58. The operation signal generation circuit M34 can generate the operation signal MSt in a manner similar to that of the operation signal generation circuit M26.

Functions of the present embodiment will be described. When the user operates the steering wheel 10, the torque applied to the steering wheel 10 is transmitted to the rack shaft 46 via the output shaft 98. The steered-side motor 56 generates torque in accordance with the assist torque Ta*. This torque is also transmitted to the rack shaft 46.

When the steering angle θh becomes equal to or larger than the steering angle threshold θhth, the assist torque Ta* becomes smaller than the base value Ta1* by the first reaction force Fie1. The first reaction force Fie1 increases rapidly once the steering angle θh exceeds the steering angle threshold θhth. Accordingly, the assist torque Ta* decreases rapidly once the steering angle θh exceeds the steering angle threshold θhth. Large torque is therefore required in order to operate the steering wheel 10 to further increase the steering angle θh. The steering angle θh is thus restrained from changing rapidly and reaching its upper limit value.

When the steered angle θp becomes equal to or larger than the steered angle threshold θpth, the assist torque Ta* becomes smaller than the base value Ta1* by the second reaction force Fie2. The second reaction force Fie2 increases rapidly once the steered angle θp exceeds the steered angle threshold θpth. Accordingly, the assist torque Ta* decreases rapidly once the steered angle θp exceeds the steered angle threshold θpth. Large torque is therefore required in order to operate the steering wheel 10 to further increase the steered angle θp. The steered angle θp is thus restrained from changing rapidly and reaching its upper limit value.

At least one of the matters described in each of the above embodiments may be modified as follows. The steering angle obtaining circuit described in "SUMMARY OF THE INVENTION" corresponds to the target steering angle setting circuit M22 in FIG. 2 and the subtraction circuit M50 in FIG. 4. The steered angle obtaining circuit corresponds to the addition circuit M30 in FIG. 2 and the integration circuit M4 in FIG. 4. The first limiting circuit corresponds to the first limiting reaction force setting circuit M6, the target steering angle setting circuit M22, the steering angle control circuit M24, and the operation signal generation circuit M26 in the first embodiment, and corresponds to the first limiting reaction force setting circuit M6, the correction circuit M54, and the operation signal generation circuit M34 in the second embodiment. The second limiting circuit corresponds to the second limiting reaction force setting circuit M8, the target steering angle setting circuit M22, the steering angle control circuit M24, and the operation signal generation circuit M26 in the first embodiment, and corresponds to the second limiting reaction force setting circuit M8, the correction circuit M54, and the operation signal generation circuit M34 in the second embodiment. The external device corresponds to the battery 82.

In the above embodiment, the target steering angle setting circuit (M22) sets the target steering angle θh* by using the model formula given by the formula (c1). However, the present invention is not limited to this. For example, the target steering angle setting circuit (M22) sets the target steering angle θh* by using a model formula given by the following formula (c2).

$$Ff = K \cdot \theta h^* + C \cdot \theta h^{*\prime} + J \cdot \theta h^{*\prime\prime} \quad (c2)$$

A spring coefficient K models the influence of the vehicle and is determined by specifications such as suspension and wheel alignment.

The present invention is not limited to setting the target steering angle θh* by using a model formula. For example, the target steering angle θh* may be set by using a map that defines the relationship between the final axial force Ff and the vehicle speed V and the target steering angle θh*. In the above configuration, the target steered angle setting circuit (M22, M28, M30) calculates the target steered angle θp* by adding the target operating angle θa* to the target steering angle θh* calculated based on the final axial force Ff. However, the present invention is not limited to this. For example, the target steered angle setting circuit (M22, M28, M30) may directly calculate the target steered angle θp* by using a model formula based on the above formula (c1) or (c2).

In the above embodiment, the steering angle control circuit (M24) sets the manipulated variable for feedback controlling the steering angle θh to the target steering angle θh* to the sum of the output values of the proportional, integral, and derivative elements each receiving the target steering angle θh* minus the steering angle θh. However, the present invention is not limited to this. For example, the steering angle control circuit M24 may be formed only by the integral element and may set the manipulated variable to the output value of the integral element. Alternatively, the steering angle control circuit M24 may be formed only by the integral and proportional elements and may set the manipulated variable to the sum of the output values of the integral and proportional elements.

The manipulated variable is not limited to torque. For example, the manipulated variable may be a q-axis current in the case of controlling a d-axis current of the reaction force motor 26 to zero.

In the above embodiment, the steered angle control circuit (M32) sets the manipulated variable for feedback controlling the steered angle θp to the target steered angle θp* to the sum of the output values of the proportional, integral, and derivative elements each receiving the target steered angle θp* minus the steered angle θp. However, the present invention is not limited to this. For example, the steered angle control circuit M32 may be formed only by the integral element and may set the manipulated variable to the output value of the integral element. Alternatively, the steered angle control circuit M32 may be formed only by the integral and proportional elements and may set the manipulated variable to the sum of the output values of the integral and proportional elements.

The manipulated variable is not limited to torque. For example, the manipulated variable may be a q-axis current in the case of controlling a d-axis current of the steered-side motor 56 to zero. In the first embodiment, the first limiting reaction force setting circuit (M6) may set the first reaction force Fie1 based on the steering angle θh instead of the target steering angle θh*.

In the first embodiment, the second limiting reaction force setting circuit (M8) may set the second reaction force Fie2 based on the steered angle θp instead of the target steered angle θp*.

Regarding the reaction force, in the first embodiment, the control device 60 may not include the base reaction force setting circuit M10 and the hysteresis reaction force setting circuit M12. That is, the total reaction force Fir may not include the base reaction force Fib and the hysteresis reaction force Fih.

For the control to increase the reaction force, in the first embodiment, the reaction force actuator 20 is operated in order to feedback control the steering angle θh to the target steering angle θh*, and the control to increase the reaction force is implemented by setting the target steering angle θh* based on the first reaction force Fie1 and the second reaction force Fie2. However, the present invention is not limited to this. For example, the control device 60 may include a map that defines the relationship between the steering angle θh and the vehicle speed V and the first reaction force Fie1 and a map that defines the relationship between the steered angle θp and the vehicle speed V and the second reaction force Fie2 to calculate the first reaction force Fie1 and the second reaction force Fie2, and may set a command value of the torque of the reaction force motor 26 to the assist torque minus the total reaction force Fir obtained based on the first and second reaction forces Fie1, Fie2.

In the first embodiment, the control to increase the reaction force may be performed with the clutch 12 switched to the engaged state. This makes it easier to increase the reaction force to be applied to the steering wheel 10 even if the reaction force motor 26 is reduced in size.

The limiting control to operate the reaction force actuator 20 so as to urge the user to stop operating the steering to the side where the steering angle further increases is not limited to the control to increase the reaction force. For example, the limiting control may be the process of applying vibrations to the steering wheel 10.

The limiting control is not limited to the control using the reaction force actuator 20. For example, the limiting control may be a process of giving an alarm by operating a device other than the steering device which includes a speaker etc. The input which the control device 60 receives to perform the limiting control is not limited to the two parameters, namely the steering angle θh or the target steering angle θh* and the steered angle θp or the target steered angle θp*. For example, in the configuration in which different steered-side motors apply torque to different portions of the rack shaft 46, the control device 60 may receive a pair of steered angles in accordance with the detected values of the rotation angles of the steered-side motors and the steering angle in order to perform the limiting control. In this case, the control device 60 may include a pair of control reaction force setting circuits that receive the pair of steered angles. In other words, the control device 60 may include a third control reaction force setting circuit in addition to the second limiting reaction force setting circuit M8. For example, in four-wheel steering vehicles, the control device 60 may receive the steered angle of the front wheels, the steered angle of the rear wheels, and the steering angle.

In the above embodiments, the steering angle ratio variable setting circuit M28 variably sets the steering angle ratio in accordance with the vehicle speed V. However, the present invention is not limited to this. For example, the steering angle ratio may be variably set based on the steering angle θh in addition to the vehicle speed V. For example, the steering angle ratio may be controlled as a manipulated variable for known drive assist control such as electronic stability control and lane keep assist control for vehicles. For example, this can be implemented by obtaining information on the steering angle ratio from a device that calculates the steering angle ratio in accordance with the drive assist control.

The steering-side sensor (62) is not limited to the rotation angle sensor that detects the rotation angle θs0 of the rotary shaft 26a of the reaction force motor 26. For example, the steering-side sensor may be a sensor that detects the rotation angle of the steering shaft 22.

The steered-side sensor (66) is not limited to the rotation angle sensor that detects the rotation angle of the rotary shaft 56a of the steered-side motor 56. For example, the steered-side sensor may be a sensor that detects the rotation angle of the pinion shaft 50. The steered-side sensor is not limited to the rotation angle sensors. For example, the steered-side sensor may be a sensor that detects the amount of axial displacement of the rack shaft 46.

The steering actuator (40) is not limited to the steering actuator including the first rack and pinion mechanism 48 and the second rack and pinion mechanism 52. For example, the steering actuator may apply the torque of the steered-side motor 56 to the pinion shaft 42 of the first rack and pinion mechanism 48 via the steered-side reduction gear 54.

The present invention is not limited to the configuration including the rack and pinion mechanisms. For example, the present invention may be of a ball-nut type. Control of the VGR system is not limited to the control shown in FIG. 4. For example, the target steered angle θp* may be calculated from the sum of the base value Ta1* and the steering torque Trq based on a model, the assist torque Ta* may be corrected based on a manipulated variable for feedback controlling an actual steered angle θp to the target steered angle θpt, and the corrected assist torque Ta* may be applied to the operation signal generation circuit M34.

The steering-side device (80) is not limited to the horn 80. The steering-side device (80) may be an airbag etc.

The upper limit value of the steering angle need not necessarily be determined by the spiral cable. For example, in the case where the steering device includes a sensor that detects the rotation angle of the steering shaft 22 and the sensor has a detection upper limit value, the upper limit value of the steering angle may be determined by the detection upper limit value of the sensor.

The upper limit value of the steered angle need not necessarily be determined by the upper limit value of the amount of displacement of the rack shaft 46. For example, in the case where the steering device includes a sensor that detects the amount of displacement of the rack shaft 46 and the sensor has a detection upper limit value, the upper limit value of the steered angle may be determined by the detection upper limit value of the sensor.

What is claimed is:

1. A steering control device that outputs an operation signal to a steering device in which a steering angle ratio is variable, the steering angle ratio being a ratio of a steered angle of a steered wheel of a vehicle to a steering angle that is a rotation angle of a steering, the steering control device comprising:
    a steering angle obtaining circuit;
    a steered angle obtaining circuit,
        the steering angle obtaining circuit obtaining the steering angle independently from the steered angle obtaining circuit, and the steered angle obtaining circuit obtaining the steered angle independently from the steering angle obtaining circuit;
    a first limiting circuit that performs limiting control to urge a user to stop operating the steering to a side where the steering angle further increases, when the obtained steering angle reaches a steering angle threshold; and
    a second limiting circuit that performs limiting control to urge the user to stop operating the steering to the side where the steering angle further increases, when the obtained steered angle reaches a steered angle threshold.

2. The steering control device according to claim 1, wherein
    the limiting control is control to increase a reaction force by outputting an operation signal to the steering device, the reaction force being a force against operation of the steering.

3. The steering control device according to claim 2, wherein
    the steering device includes a reaction force actuator that applies to the steering the reaction force that is the force against operation of the steering, and a steering actuator that applies a force that steers the steered wheel at least with power transmission being cut off between the steered wheel and the steering, and
    the control to increase the reaction force is implemented by operating the reaction force actuator.

4. The steering control device according to claim 3, wherein
    the first limiting circuit includes a first limiting reaction force setting circuit that sets a first reaction force that is a reaction force for the limiting control,
    the second limiting circuit includes a second limiting reaction force setting circuit that sets a second reaction force that is a reaction force for the limiting control,
    the first reaction force is set to a value larger than zero if the steering angle is equal to or larger than the steering angle threshold,
    the second reaction force is set to a value larger than zero if the steered angle is equal to or larger than the steered angle threshold,
    the first limiting circuit and the second limiting circuit include a target steering angle setting circuit that sets a target steering angle that is a target value of the steering angle, based on a sum of the first reaction force and the second reaction force, a steering angle control circuit that operates the reaction force actuator in order to feedback control the steering angle, which is based on an output value of a steering-side sensor that detects a rotation angle of a rotary shaft that rotates in accordance with rotation of the steering, to the target steering angle, a target steered angle setting circuit that sets a target steered angle that is a target value of the steered angle, based on the sum of the first reaction force and the second reaction force, and a steered angle control circuit that operates the steering actuator in order to feedback control the steered angle, which is based on an output value of a steered-side sensor that detects an amount of displacement of a member that is displaced in accordance with steering of the steered wheel, to the target steered angle,
    the steering angle obtaining circuit obtains the target steering angle, and
    the steered angle obtaining circuit obtains the target steered angle.

5. The steering control device according to claim 4, wherein
    the steering is equipped with a steering-side device that rotates with the steering, and
    the steering-side device is connected via a signal cable to an external device that rotates relative to the steering.

6. The steering control device according to claim 2, wherein
    the steering device includes a steering actuator that steers the steered wheel, and a variable steering angle ratio actuator that changes the steering angle ratio with transmitting torque applied to the steering to the steered wheel, and
    the control to increase the reaction force is implemented by performing an operation to reduce an assist force that assists, with the steering actuator, the steering of the steered wheel which is caused by operation of the steering.

7. The steering control device according to claim 1, wherein the steering is equipped with a steering-side device that rotates with the steering, and the steering-side device is connected via a signal cable to an external device that rotates relative to the steering.

* * * * *